April 25, 1933. F. SCHAUM 1,905,950
DRIVE RELEASE AND BRAKE FOR EXTRACTORS
Original Filed March 29, 1928  4 Sheets-Sheet 2
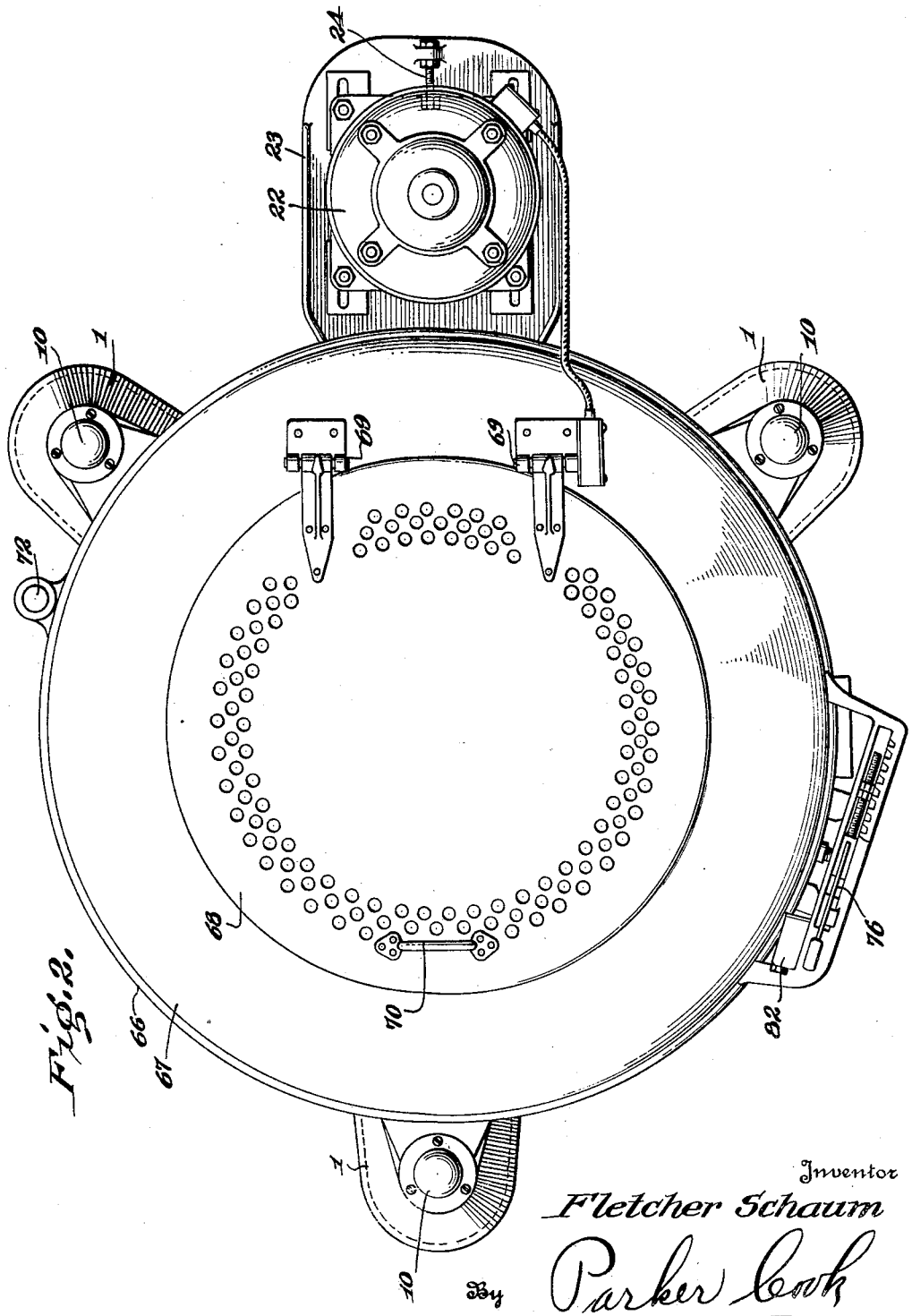

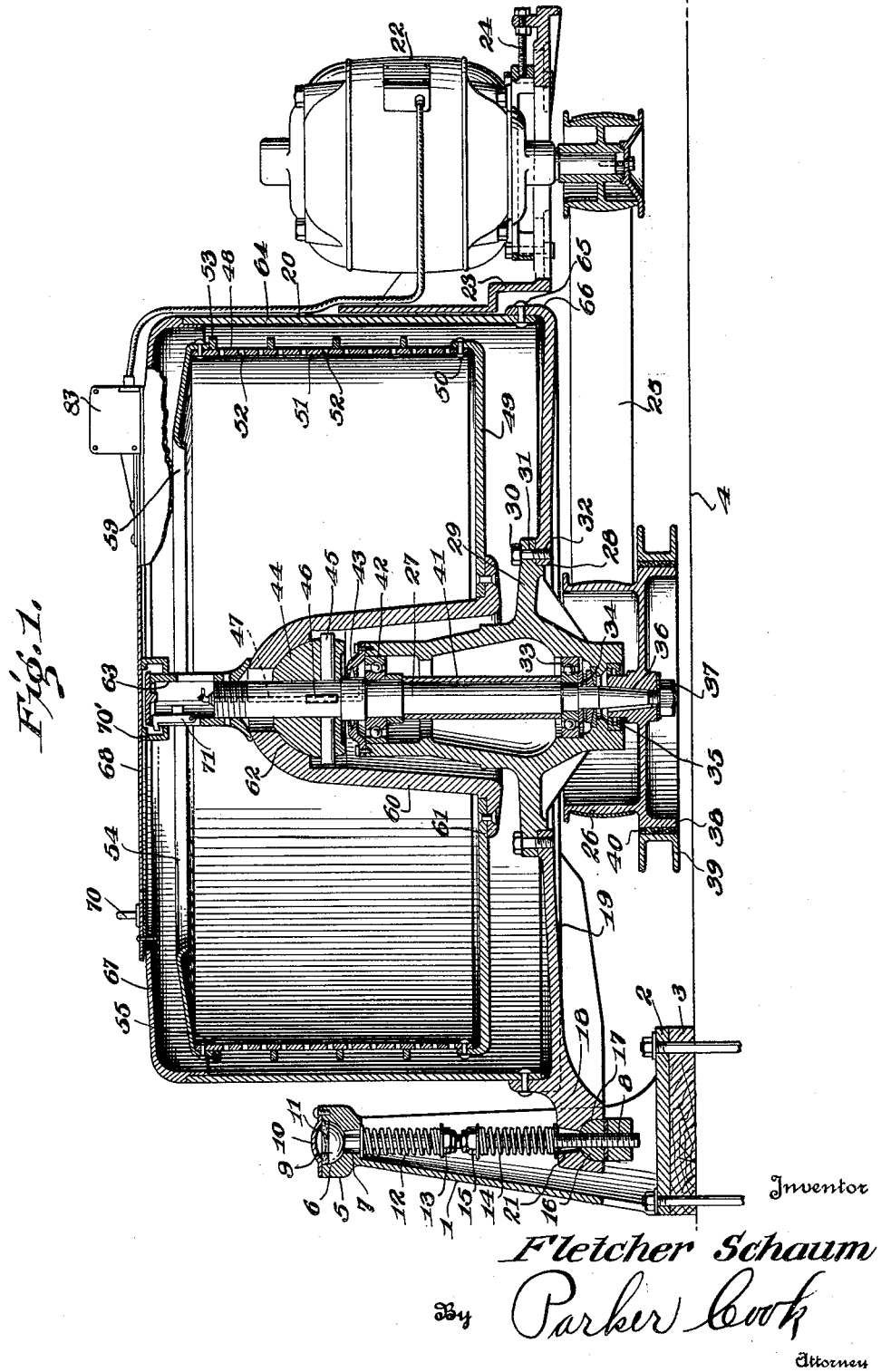

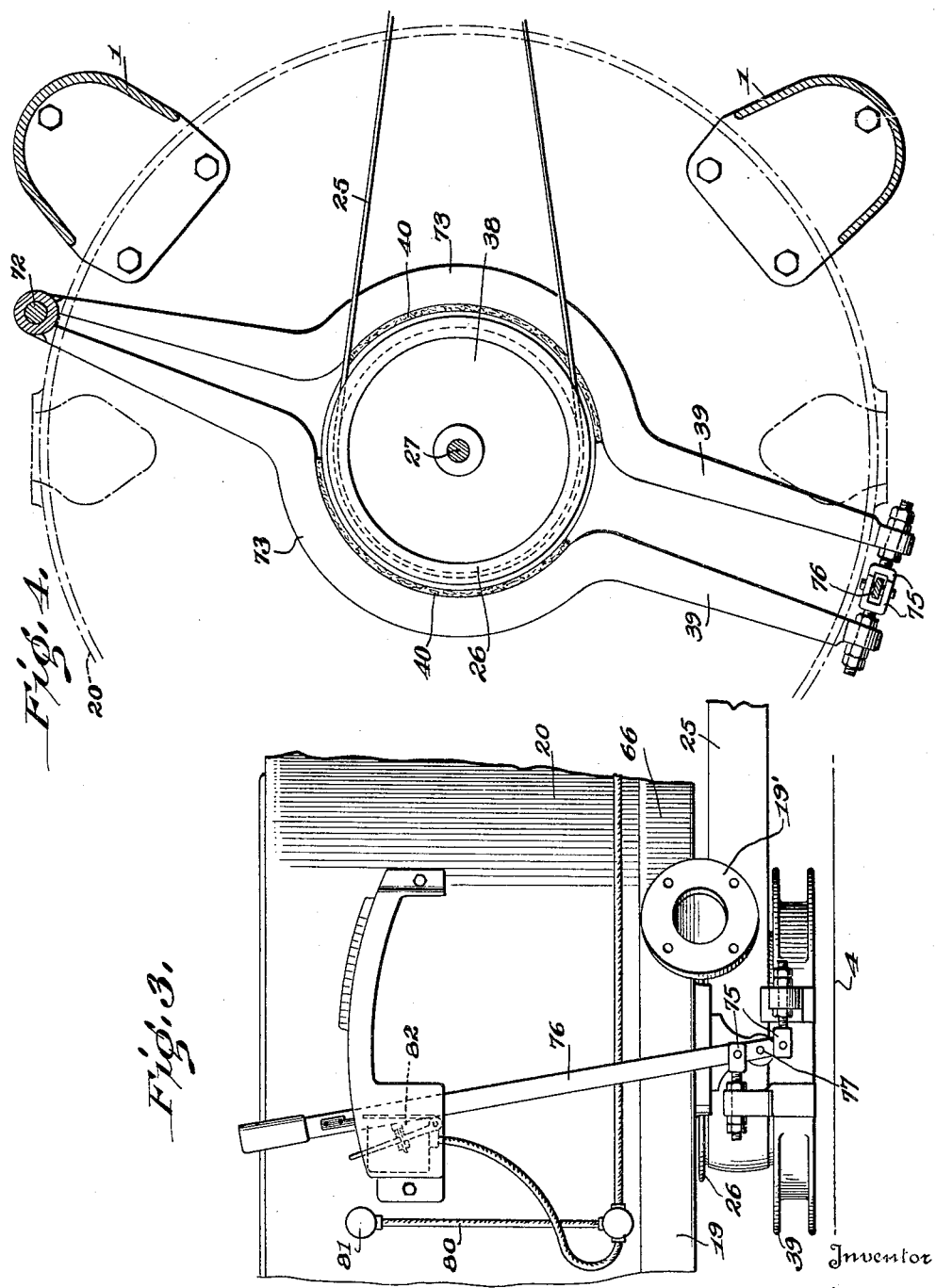

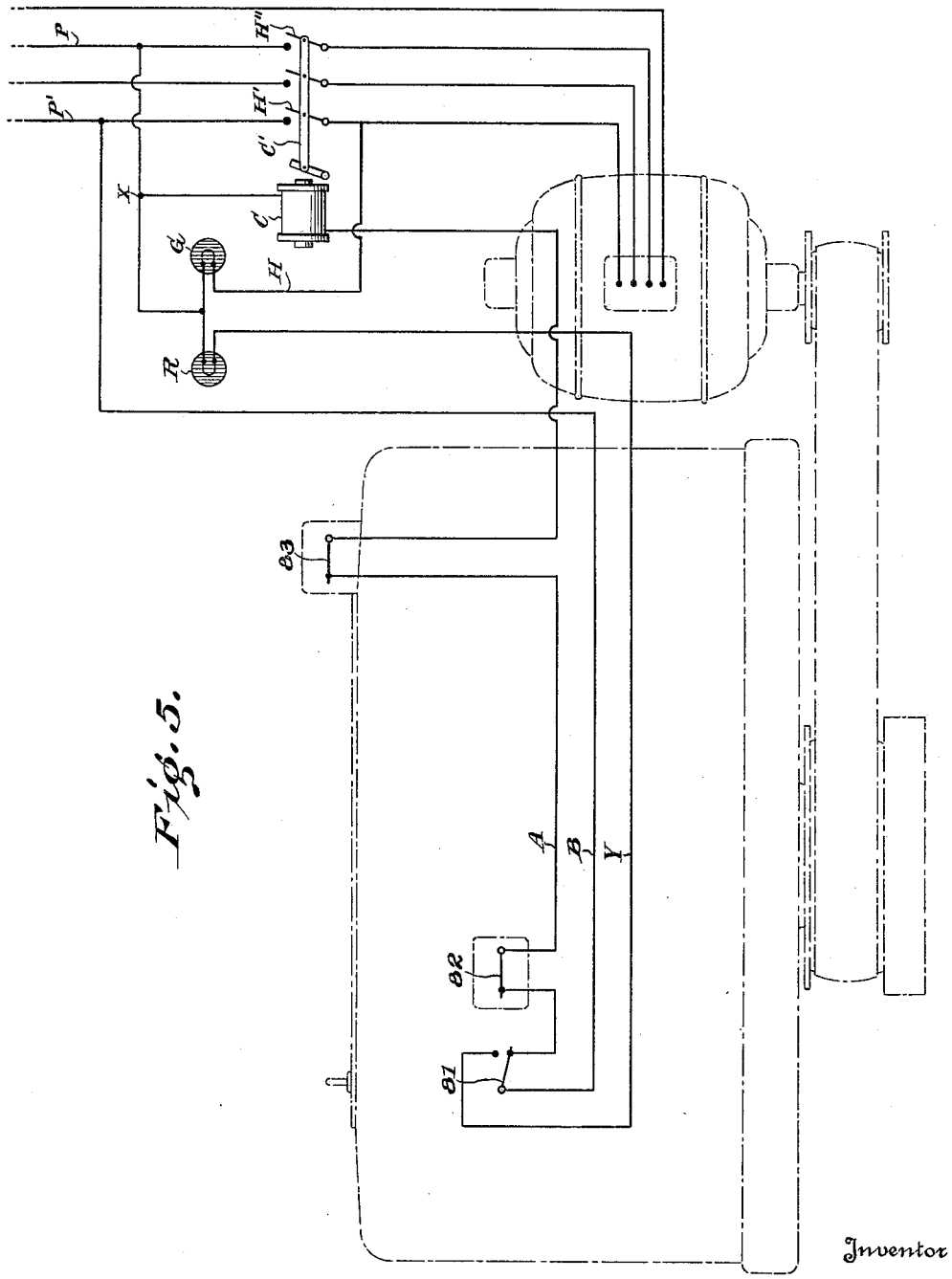

Patented Apr. 25, 1933

1,905,950

UNITED STATES PATENT OFFICE

FLETCHER SCHAUM, OF PHILADELPHIA, PENNSYLVANIA, ASSIGNOR TO FLETCHER WORKS, OF PHILADELPHIA, PENNSYLVANIA, A CORPORATION OF PENNSYLVANIA

DRIVE RELEASE AND BRAKE FOR EXTRACTORS

Original application filed March 29, 1928, Serial No. 265,761. Divided and this application filed November 10, 1928. Serial No. 318,408.

My invention relates to a new and useful improvement in drive release and brake for extractors and it consists in the novel features hereinafter described and claimed.

The subject-matter of the present application is divided from my prior application for patent on hydro-extractor filed March 29, 1928, Serial No. 265,761, Patent No. 1,766,-310, of June 24, 1930.

The release and brake device is especially adapted to be used upon extractors of large capacity type intended to handle heavy bags, nets, bulk work, yarn, etc., such extractor including a balancing arrangement, that is, the three point suspension guard, the supporting shaft fixedly mounted in the guard, and a freely mounted basket on the shaft, which increases the balancing tendency and enables the machine to handle unbalanced loads without requiring adjustment.

An object of the invention is to provide a hydro-extractor with a special form of brake such as a toggle brake wherein the same will grip the pulley evenly upon both sides and thereby eliminate any strain on the bearings and due to the great leverage, the loaded basket may be stopped within fifteen seconds.

It should be remembered that some of these extractors weigh thirty-eight hundred pounds and the baskets are forty-eight inches in diameter and when traveling at seven hundred and fifty revolutions per minute, exert excessive centrifugal force.

Another object of the invention is to provide a brake that may be quickly removed for relining and replacing without taking the machine apart in any way.

A further object of the invention is to provide an extractor with very fast acceleration, a high running speed, and a relatively quick stop.

Another object of the invention is to provide an extractor wherein the entire machine is supported at three different points, and the machine so hung that the central shaft or support may be connected by a belt to a motor, which motor is mounted on the guard so that there will be no difference in the torque regardless of the lateral movement of the guard and basket.

A still further object of the invention is to provide a hydro-extractor suspended from three points so that the weight of the machine will tend to overcome any gyrations that might otherwise be present in the extractor, that is, gyrations of the central shaft and guard.

A still further object of the invention is to provide a hydro-extractor wherein the basket is mounted freely but the shaft and guard are so arranged that there may be a slight lateral movement of the guard and shaft so that the vibration in turn may be taken up in the three points of support, rather than being transmitted directly to the floor on which the machine is mounted.

With these and other objects in view the invention consists in certain new and novel arrangements, and combination of parts as will be hereinafter more fully described and pointed out in the claims.

Referring now to the drawings showing a preferred form of the embodiment of the invention:—

Figure 1 is a vertical sectional view of the extractor showing one of the supporting legs, the vertical type motor being shown in elevation, the pulley of the latter being shown in section;

Figure 2 is a top plan view showing the cover in closed position;

Figure 3 is a fragmentary side elevational view showing the control lever connected to the brake and showing in dotted lines one of the controlling switches;

Figure 4 is a fragmentary section showing the arrangement of the toggle joint, and Figure 5 is a wiring diagram showing the manner in which the control and motor for the hydro-extractor are wired.

Referring now more specifically to Figs. 1 and 2, there will be seen three metal supporting legs 1, and as they are alike, a description of one will be a description of all. The metal leg may be a casting and comprise a base or foot 2 which will be bolted on a wooden block 3, or any other block, so that the lowermost point of the machine will be slightly above the floor 4.

The top portion 5 of the leg is provided with a socket 6 through which extends the small opening 7, so that a threaded rod or hanger 8 may be inserted therethrough, which rod 8 is to be provided with a ball 9 at its upper end to fit within the socket 6.

There may be a little cover 10 and felt wick 11 over the top of the ball, so that this frictional joint may be oiled and kept free from dust.

Still referring to Figure 1, and to the support in question, there will be seen two springs on this rod 8, the upper spring 12 being held in place by the nut 13, and the lower spring 14 being held in place and adjustable by the nut 15.

On the lower end of the hanger on the rod 8, there will be seen in position, another ball 16 or a portion of one, designed to fit tightly within a socket 17 in a leg 18 of the base plate 19 of the guard 20. There is also the opening 21 extending to the socket 17 so that the aforementioned rod 8 may pass down into the same.

As mentioned heretofore, there are three of the lugs or supports which engage and cooperate with the three feet or lugs 18 disposed in certain spaced relation about the base plate of the guard.

As far as the specification has proceeded, it will be seen that the guard is suspended so that the same is capable of a slight lateral motion or vibratory movement in a horizontal plane, which motion will be transmitted to the hangers, and mostly absorbed rather than being transmitted to the floor on which the guard is mounted.

By having the adjustable springs on the hangers, the guard, through the connection of the feet, may be forced downwardly tightly in position, which, together with the weight of the machine, will prevent any rocking or tipping motion of the guard. In other words, when the basket about to be described, rotates in a high rate of speed in the guard, there would be a tendency to have the guard rock or tilt unless spring pressure is exerted to tightly hold the guard on the hangers. However, due to the frictional contact of the balls and the respective sockets, plus the weight of the machine and the spring pressure, the guard will move laterally or may possibly be shifted slightly about its three points of suspension, but will not rock or tilt to any appreciable degree, as far as can be seen, will always be sustained in a horizontal plane.

Furthermore, there is a motor 22 adjustable longitudinally on the bracket 23, which bracket is secured to the side of the guard, the adjusting movement being regulated by the bolt 24, so that should it be necessary to tighten the belt 25, attached to the pulley 26 on the main support or shaft 27, this may be done, and the machine balanced by tightening the spring on the leg opposite the motor.

By mounting the motor on the guard, the guard may move laterally or shift its position without in any way disturbing the torque of the shaft 27.

The explanation of the manner of support and the shaft 27 is set out rather fully, but it is of great importance as, unless the machine is properly supported and proper springs provided, and unless the drive shaft in turn is properly supported within the guard, the machine would vibrate or rock due to the centrifugal force of the rotating basket.

Understanding now, therefore, how the machine is mounted or suspended, a more specific description will follow of the shaft, guard and basket, control and brake.

Referring to Figure 1 in particular, there will be seen centrally of the bottom or guard plate 19, a central opening 28 in which there is mounted a casting 29, in turn held in position in the opening 28 by the bolts 30 which extend through holes 31 of the casting, and holes 32 in the rim about the opening 28.

Near the bottom of the casting is the ball race 33, in turn fitting on the thrust bearing 34 while a wick 35 may be seen at the lower end of the casting. The casting 29 is a hollow one and is adapted to receive the main shaft 27, which shaft may be tapered at its lower end as at 36 to receive the hub of the belt pulley 26, which pulley in turn is locked on by the nut 37.

It might be mentioned at this point that the pulley 26 is in the form of a double pulley, so that there may be placed about the rim 38 a brake 39 with the brake lining 40, which brake will be shortly described.

About the shaft 27, there may be seen the collar or tube 41, in turn extending up to the ball race 42, while a small cover 43 may be seen at the top of the casting. Fixed near the upper end of the shaft 27 is the large metal ball or portion of one 44, while extending through this ball is the small cross shaft 45 in turn held in position by the key 46, the shaft or stub extending slightly beyond the outer circumference of the said ball.

The upper end of the shaft is drilled as at 47 so that oil or grease may be fed to the ball bearing 42 and in turn drop down on the bearing 33. When the motor, therefore, is started, the shaft 27 and its ball and stub shaft may be rotated to in turn rotate the basket 48, now to be described.

*Basket*

As may be seen in Figure 1, this basket 48 comprises a bottom plate 49, with the upstanding flanges 50 about its peripheral edge to which in turn is riveted the side wall 51 in turn provided with a plurality of holes or perforations 52.

To strengthen this basket, metal rings 53 are placed around the side wall, and I have found that four of them will provide the sufficient strength. The upper peripheral edge of the basket is provided with a heavy brass plate 54, riveted as at 55, while the inner peripheral edge of this plate is slightly rounded as at 59.

Secured centrally of the bottom plate 49 of the basket is the casting 60 which is dome-shaped, having the lower outstanding flange 61 to which the bottom plate is securely riveted, there, of course, being an opening in the bottom plate to receive the casting.

The internal diameter of this casting is greater than the external diameter of the previously mentioned casting 29, so that the basket is free to tilt from the vertical to a slight degree. The upper inner surface of this casting 60 is in the form of a socket 62 to nicely or snugly fit the aforementioned ball 44. At the base of the socket there are two small cut out portions opposite the ends of the shaft 45, so that the said ends may fit within the cut out portion and bear against the adjacent walls of this cut out portion, so that a rotation of the shaft 27 and the cross shaft will in turn transmit rotation of the basket.

From this it will be seen that the basket is what is known as freely mounted, or in other words, may tilt or rock slightly in any direction with relation to its shaft or support.

The dome of the casting has a passageway therein, so that the upper end of the shaft 27 may extend therethrough and into the small housing or cover 63.

Referring now for the moment to the guard 20, in which is rotated the basket 48, it will be seen that it comprises the base 19 and the casting 29, and also comprises the outer wall 64, riveted at its lower edge by the rivets 65, the base plate having the flanges 66, while at the upper ends of the side wall 64 is the large rim 67, welded or otherwise fastened to the said side wall.

Of course there is an outlet for the water that is extracted from the material in the basket, and in Fig. 3 I have shown the outlet 19' to which may be bolted a discharge pipe (not shown). Although I have not shown the specific construction of the outlet 19', it will be understood that there is generally a small trough built in the bottom of the guard so that the water will flow into this trough and through the outlet 19'.

Referring for the moment to Fig. 2, there will be seen a cover 68 hinged as at 69, and a handle 70, so that when the clothes are to be inserted or removed from the basket, this cover may be thrown back.

I have provided a little safety device for always holding the cover in position when the basket is rotating, by placing a small channel iron 70' centrally of the cover, and to cooperate with this small hook 71 (see Fig. 1) is pivoted the small housing 63.

When the machine, that is, the basket, is rotating, the centrifugal force will cause the hook 71 to attain the position as shown, the jaws of the hook extending over the edge of the angle 70'. However, when the centrifugal action ceases, the hook 71 will fall downwardly and become disengaged from the channel and permit the opening of the cover.

I provide this as it is dangerous to try to remove anything from the basket even though the same is rotating at a low rate of speed, it having caused operators at different times to have their arms torn from the shoulder.

*Brake mechanism*

Referring now to the braking mechanism 39, and referring to Figs. 1, 3 and 4 in particular, it will be seen that the brake consists of two arms 39 pivoted at their one end as at 72, these arms being bowed in the center as at 73 to encircle or encompass the pulley 39 heretofore referred to, while a brake lining 40 is carried on each bowed portion of the arms as may be clearly seen in Figure 4. The outer ends of these arms 39 are connected by bolts and links 75 to an operating lever 76, pivoted as at 77, so that when the handle 76 is thrown to the right (Fig. 3), it will tightly pull these arms toward each other to thus tightly grip the brake band 40 about the pulley 39 and thus slow down or stop the machine.

When the lever 76 is in the position shown in Fig. 3, the outer ends of the brake arms are slightly forced apart, thus removing the tension about the pulley connected to the lower end of the shaft 27.

By using this toggle arrangement, great force can be applied to the brake, which of course is necessary, as it is to be remembered in the large size the rotating basket weighs approximately 1700 pounds, and revolves at about 750 R. P. M.

There is another advantage of having the brake formed in the manner just described, and that is, it will be noticed that it is not necessary to remove the basket or the central shaft when desired to reline the brake, which has to be done more or less frequently.

In the present instance, all that is necessary, is to release the pin 72 and remove the links and bolts 75 at the outer ends of the arms 39.

In this manner, the arms 39 may then be spread apart and pulled from beneath the machine, a new brake lining placed in position and the brake again assembled.

*Controls*

As previously mentioned in the application, the starting, coasting and stopping operation are controlled from a single source, that is, after the current is once turned on. As also heretofore mentioned, in the first or running position, the brake is off and the power is on, and the cover must be closed before the machine will start, as will be shortly described. In the second, or coasting position, both brake and power are off; while in the third or stopping position, the brake is on and the power is off. This is accomplished by an electrical wiring system and switches and relays, which are diagrammatically shown in Fig. 5, in cooperation with the handle 76, heretofore mentioned.

Referring to Figure 3 for the moment, there will be seen a cable 80, that is, the insulation or cover for the cable, extending through a switch 81 on the machine or connected or positioned on a wall or other convenient place.

Still referring to Figure 3, there may be seen in dotted lines, a small switch 82 in its closed position when the lever 76 is thrown to its extreme limit to the left, so that the circuit through the lines A and B (Fig. 5) will be closed.

This switch 82 will remain closed when the brake is off, that is, when the lever is all the way to the left, and will also remain closed, after the lever 76 has been shifted a slight degree to the right, and then the switch or contact is broken so that when the brake is in a coasting position, the switch is open and the power is off, and of course the brake is off.

Referring for the moment to Fig. 1, there will be seen a small switch box containing the top cover switch 83, so that when the cover is open, the circuit through A and B will be broken, and the machine cannot be started even though the timing switch be thrown on or the switch 82 be in operative position, thus making it impossible to start the rotation of the basket when the cover is in its open position.

It will be seen that the line A runs to a magnetic contact or solenoid C from which a lead extends over to one power line P. There is also a connection at the point X from which there is a lead to a green light G to show an operator whether the machine is running or idle.

From the green light G extends a lead H so that when the shaft C' of the solenoid is pulled inwardly, the switch arm H' will contact with the other power line P'. At the same time the power line P will be closed through the small arm H'', so that the motor may be energized and the center shaft 27 and the basket be set in motion.

If, however, the timing switch 81 is turned to its off position, that is, just opposite from the position shown in Fig. 5, and the small switch arm thrown to an upper position, it will be seen that the circuit is broken through A and B, but a lead Y will be closed or thrown into circuit with the lead B, the current passing through Y up through the red light R and over to the power line P.

A small knife-switch or other form of switch may be placed in the main power line so that of course the current may be entirely cut off from the machine, in order that the red light R will not operate when the machine is standing idle at night, or not in service.

It will be seen that there is a timing circuit for the motor and that there is really an operating circuit for energizing the motor by the different control set forth.

From this description of the controls and wiring diagram, it will be seen that the machine is always under the control of the operator, and that when the machine is running and the brake off, the power is on, but when the brake is on or when the machine is coasting, the power is off. Furthermore, it is impossible to run the machine when the cover is open, and lastly signal lights always show whether the machine has been stopped or whether it is in operation.

*Résumé*

From the foregoing, the operation of the machine will be readily understood, as the machine is very simple to operate. The control handle 76, when manipulated, will either start or stop the machine or allow the same to coast.

As in all rotating bodies, there is what is known as "the critical point", and after the machine is first started the basket may rock or tilt slightly, that is when traveling around 300 or 400 R. P. M., but when this point is passed, the rotation of the basket is very smooth.

By providing springs and adjusting them so that the front spring exerts about 800 pounds pressure, and the two back springs 650 pounds pressure; or in other words, adjusting the supporting spring to offset the difference in weight on the three lugs, due to the overhang of the motor at the back, it is possible to handle a very great unbalanced load in the basket.

Furthermore, by using three balancing or supporting posts which are vertical and therefore parallel with each other and parallel with the extractor shaft, any oscillation would raise the whole machine parallel to its normal position.

The machine described should not be run above a normal speed of say 750 R.P.M., as at a higher rate, it will jump, or tend to "pound".

It will be noticed that the basket has the ball center practically at the center of the basket, and does not have the weight concentrated. As the centers nearly coincide, an unbalanced weight may move the basket-axis away from the vertical, and the small restoring force will not overcome the friction of the supporting ball and socket to bring it back to vertical. However, the basket will operate just as well even though it revolves in a plane slightly from the horizontal.

It will also be noticed that the shaft always remains parallel to its normal position and that the weight of practically the entire machine, plus the friction caused by the springs, tends to hold the machine from any rocking or jarring action, and at the same time allows a slight lateral action which is absorbed by the supports rather than being transmitted to the floor.

As before stated, the normal speed is about 750 R. P. M. and at this rate, the water will be quickly extracted from the material in the basket, and at the same time, the machine will run quietly and smoothly and with but relatively little lateral movement considering the mass that is rotated and the rate of rotation.

I am aware that it is old to provide extractors to carry unbalanced loads designed to travel at a very high rate of speed, and wherein the basket and its shaft are designed for free gyration, but it will be seen and understood that with my device, the entire weight of the machine is so suspended as to prevent free gyration. Also, heavy springs between the frictional contacts are used to overcome and restrict, as far as possible, any gyratory movement of the guard and its rotating shaft.

Many slight changes may be made without in any way departing from the spirit and scope of the invention.

Having thus described my invention, what I claim as new and desire to secure by Letters Patent is:—

1. A hydro extractor comprising a guard suspended for a slight horizontal movement, a shaft rotatably mounted in said guard, a basket tiltably mounted on the upper end of said shaft, a motor connected with said shaft for driving the same, a brake drum on the lower end of the shaft, a brake including a handle cooperable therewith, electric control means for the motor for starting and stopping the same, and said control means operable by the movement of the brake handle.

2. A hydro extractor comprising a guard suspended for a slight horizontal movement, a shaft rotatably mounted in said guard, a basket mounted on the upper end of said shaft and capable of slight self-adjustment, a motor connected with said shaft for driving the same, a brake drum on the lower end of the shaft, a band brake including a handle cooperable therewith and capable of being removed from beneath said extractor when said extractor is in its operative position, electric control means for the motor for starting and stopping the same, and said control means operable by the movement of the brake handle.

3. A hydro extractor comprising a guard suspended for a slight horizontal movement, a shaft rotatably mounted in said guard, a basket mounted on the upper end of said shaft and capable of a slight horizontal movement, a motor connected with said shaft for driving the same, a brake drum on the lower end of the shaft, a band brake including a handle cooperable therewith and capable of being quickly and easily removable from said brake drum without altering the position of the guard of the hydro extractor, electric control means for the motor for starting and stopping the same, and said control means operable by the movement of the brake handle.

4. A hydro-extractor comprising a guard, means for suspending the same, a shaft in the guard and a basket on said shaft and tiltably mounted with respect to said guard and said shaft rotated thereby, electric means for rotating said shaft, a brake drum on said shaft, a brake including a handle and a brake lining enclosing said brake drum, electrical control means for the motor, and said control means operable by the movement of the brake handle.

5. A hydro-extractor comprising a guard suspended for a slight horizontal movement, a shaft rotatably mounted in said guard, a basket tiltably mounted on the upper end of said shaft, a motor connected with the said shaft for driving the same, a brake drum on the lower end of the shaft, encircling arms provided with braking surfaces thereon for engagement with the brake drum, a brake handle connected to said encircling arms, an electric control for the motor and operated by the movement of the said brake handle.

6. A hydro-extractor including a guard, a shaft in said guard, a basket slightly rockably mounted on said shaft, a motor connected with said shaft for driving the same, a braking surface on said shaft and a brake including two arms pivoted at their one end and compressible by a handle at their other end, an electric control for the motor and also connected with the handle whereby when the brake is operated the electric control is also operated.

In testimony whereof I affix my signature.

FLETCHER SCHAUM.